United States Patent
Kanto et al.

(10) Patent No.: US 11,050,299 B2
(45) Date of Patent: Jun. 29, 2021

(54) WIRELESS POWER FEEDER

(71) Applicant: TOYODA GOSEI CO., LTD., Kiyosu (JP)

(72) Inventors: Toru Kanto, Kiyosu (JP); Shinichiro Fuki, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 145 days.

(21) Appl. No.: 16/282,771

(22) Filed: Feb. 22, 2019

(65) Prior Publication Data

US 2019/0273401 A1    Sep. 5, 2019

(30) Foreign Application Priority Data

Mar. 2, 2018    (JP) .............................. JP2018-037677

(51) Int. Cl.

| | |
|---|---|
| *H02J 50/00* | (2016.01) |
| *H02J 50/40* | (2016.01) |
| *H02J 50/12* | (2016.01) |
| *B60H 1/00* | (2006.01) |
| *H05B 45/37* | (2020.01) |
| *B60H 1/34* | (2006.01) |

(52) U.S. Cl.
CPC .......... *H02J 50/40* (2016.02); *B60H 1/00657* (2013.01); *H02J 50/12* (2016.02); *H05B 45/37* (2020.01); *B60H 2001/3471* (2013.01)

(58) Field of Classification Search
CPC .................................. H02J 50/00; H04B 5/00
USPC ......................................................... 307/104
See application file for complete search history.

(56) References Cited

U.S. PATENT DOCUMENTS

| | | | | |
|---|---|---|---|---|
| 9,908,463 | B2* | 3/2018 | Shibata .................... | B60Q 3/80 |
| 2016/0185289 | A1* | 6/2016 | Shibata .................. | B60Q 3/225 |
| | | | | 362/96 |

FOREIGN PATENT DOCUMENTS

| | | | | |
|---|---|---|---|---|
| JP | 2016-002921 A | | 1/2016 | |
| JP | 2016-120902 A | | 7/2016 | |
| JP | 2016120820 A | * | 7/2016 | |
| WO | 2020-017932 | * | 1/2020 | ............. H02J 50/00 |

OTHER PUBLICATIONS

Japanese Office Action dated Apr. 27, 2021 issued in corresponding JP application No. 2018-037677 (and English translation).

* cited by examiner

*Primary Examiner* — Adi Amrany
(74) *Attorney, Agent, or Firm* — Posz Law Group, PLC

(57) ABSTRACT

A wireless power feeder includes a power feeding circuit, two or more power receiving circuits, and an electromagnetic field coupling circuit. Each power receiving circuit includes a resonant circuit having a load, a power receiving coil, and a capacitor connected in series to each other. The power feeding circuit includes a resonant circuit having a power feeding coil and a capacitor connected in series to the power feeding coil. The power feeding coil includes surrounding portions equal in number to the power receiving coils. The surrounding portions are disposed such that one surrounding portion surrounds one power receiving coil. Adjacent surrounding portions are connected to each other.

12 Claims, 3 Drawing Sheets

WIRELESS POWER FEEDER

BACKGROUND

1. Field

The following description relates to a wireless power feeder that contactlessly feeds power to loads provided at two or more locations.

2. Description of Related Art

Japanese Patent Application Laid-open No. 2016-2921 describes a wireless power feeder that contactlessly feeds power to loads provided at two or more locations in a vehicle.

The wireless power feeder includes a power feeding circuit, power receiving circuits provided for each load, and an electromagnetic field coupling circuit. Each power receiving circuit includes a resonant circuit having a power receiving coil and a capacitor. The power receiving coil and the capacitor are connected in series to the load. The power feeding circuit includes a resonant circuit having a power feeding coil and a capacitor connected in series to the power feeding coil. As shown in FIG. 5, the power feeding coil 100 includes one surrounding portion 101 surrounding all of the power receiving coils 102, 103. The power feeding circuit converts DC voltage of an in-vehicle battery to AC voltage and applies the AC voltage to the power feeding coil 100. The electromagnetic field coupling circuit has the power receiving coils 102, 103 and the power feeding coil 100, and constitutes an electromagnetic field resonant circuit in which magnetic field coupling via mutual inductance and electric field coupling via mutual capacitance are mixed between the power receiving coils 102, 103 and the power feeding coil 100.

According to the wireless power feeder described above, the individual resonant circuits resonate with the leakage electromagnetic field of the electromagnetic field coupling circuit, and power is fed from the power feeding coil 100 serving as the primary side of the electromagnetic field coupling circuit to the power receiving coils 102 and 103 provided for the individual power receiving circuits serving as the secondary side thereof.

SUMMARY

An object of the following description is to provide a wireless power feeder capable of efficiently feeding power to two or more loads.

According to one general aspect, a wireless power feeder includes a power feeding circuit, two or more power receiving circuits, and an electromagnetic field coupling circuit. Each power receiving circuit includes a resonant circuit having a load, a power receiving coil, and a capacitor connected in series to each other. The power feeding circuit includes a resonant circuit having a power feeding coil and a capacitor connected in series to the power feeding coil. The power feeding circuit converts DC voltage of a power source to AC voltage and applies the AC voltage to the power feeding coil. The electromagnetic field coupling circuit has the power receiving coils and the power feeding coil. The electromagnetic field coupling circuit constitutes an electromagnetic field resonant circuit in which magnetic field coupling via mutual inductance and electric field coupling via mutual capacitance are mixed between the power receiving coils and the power feeding coil, and causes each resonant circuit to resonate with a leakage electromagnetic field of the electromagnetic field coupling circuit and transmit power from the power feeding coil serving as a primary side of the electromagnetic field coupling circuit to the power receiving coil of each of the power receiving circuits serving as a secondary side of the electromagnetic field coupling circuit. The power feeding coil includes surrounding portions equal in number to the power receiving coils. The surrounding portions are disposed such that one surrounding portion surrounds one power receiving coil, and adjacent surrounding portions are connected to each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
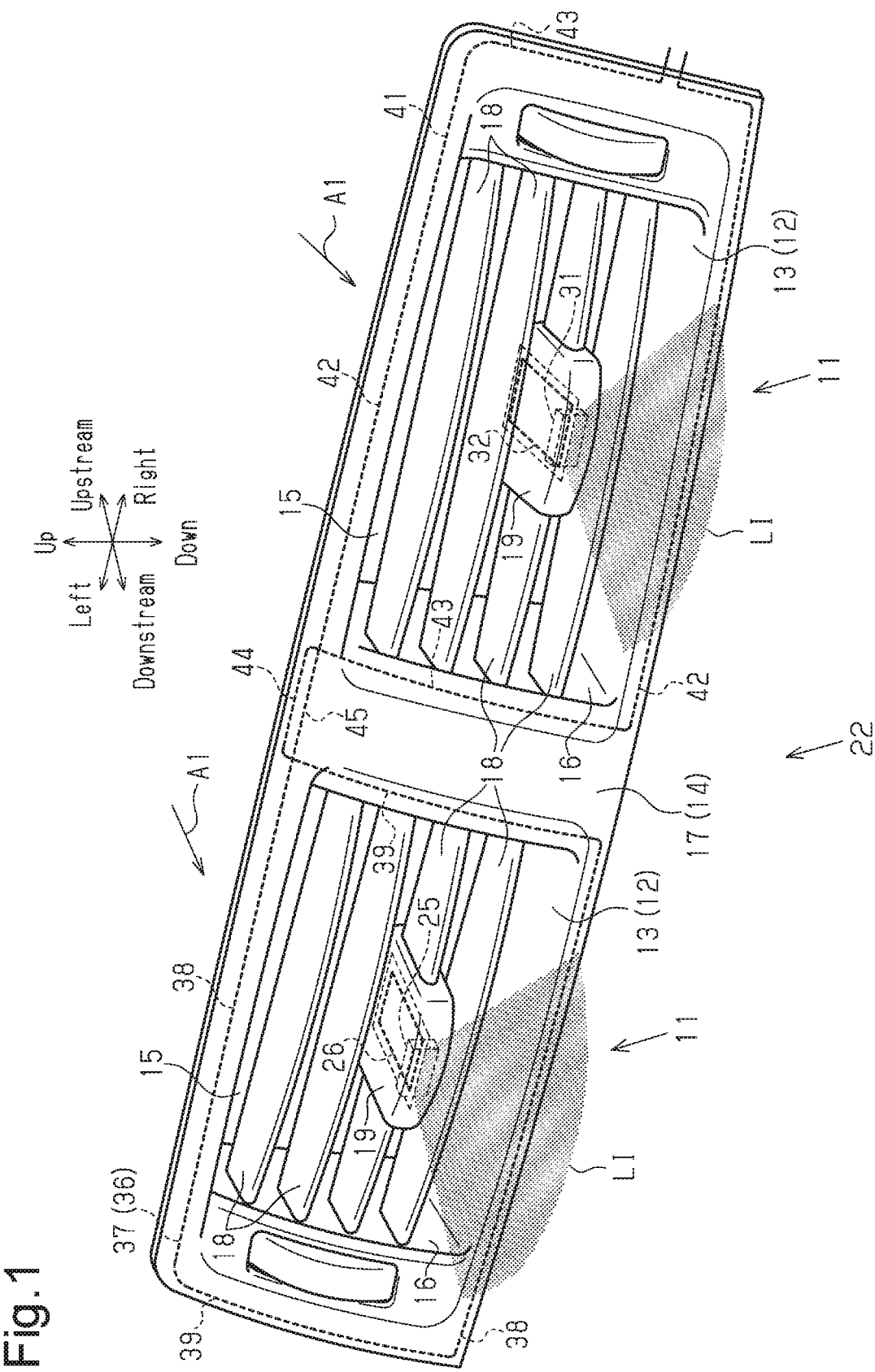
FIG. 1 is a perspective view of an air conditioning register in which a wireless power feeder according to an embodiment is incorporated.

An embodiment of a wireless power feeder applied to an air conditioning register is now described hereinafter with reference to FIGS. 1 to 3.

In the following description, the term "vertical direction" refers to a vehicle height direction. A vehicle width direction (right and left) is when the vehicle is viewed from the rear.

In the interior of a vehicle, an instrument panel is provided in front of front seats (a driver seat and a passenger seat). In the central part of the instrument panel in the vehicle width direction, two air conditioning registers 11 as shown in FIG. 1 are arranged side by side in the vehicle width direction. The air conditioning registers 11 may be operated to adjust the direction of air A1 blown from an air conditioner toward the front seats. The two air conditioning registers 11 have the same configuration.

Each air conditioning register 11 includes a retainer 12, lateral fins 18, vertical fins (not shown), and an operation knob 19. Each retainer 12 includes a retainer body 13 and a bezel 14, and may be used to connect an air duct (not shown) of the air conditioner and an opening (not shown) provided in the instrument panel.

Each retainer body 13 is in the form of a tube with open ends. The retainer bodies 13 are spaced apart from each other in the vehicle width direction. The internal space of each retainer 12 constitutes a flow path of the air A1 (hereinafter referred to as "air path 15"). Hereinafter, the term "upstream" refers to upstream of the flow of the air A1 or the side close to the air conditioner, and the term "downstream" refers to downstream of the flow of the air A1 or the side far from the air conditioner.

The bezel 14 constitutes the most downstream part of the retainers 12. In embodiments, the bezel 14 is an elongated plate-like member extending in the vehicle width direction. The bezel 14 is disposed uprightly adjacent to the downstream ends of both retainer bodies 13. In the bezel 14, an outlet 16 of the air A1 is formed at the downstream end of the air path 15 of each retainer 12. The outlets 16 are spaced apart from each other in the vehicle width direction. A central part 17 of the bezel 14 in the vehicle width direction is sandwiched between the outlets 16. A hazard switch (not shown) may be mounted to the central part 17 to be operated to turn on a hazard lamp. A part of the downstream end surface of the bezel 14 around each outlet 16 constitutes the design surface of the air conditioning registers 11.

The lateral fins 18 of the air conditioning register 11 are plate-shaped members extending in the vehicle width direction. The lateral fins 18 are disposed in the air path 15 and spaced apart from each other in the vertical direction. The lateral fins 18 are supported to be tiltable in the vertical direction relative to the retainer body 13. All of the lateral fins 18 in one air path 15 may be linked to each other so as to be operable via a parallel link mechanism that is not shown.

Although not shown, the vertical fins of the air conditioning register 11 may be plate-shaped members extending in the vertical direction. The vertical fins may be disposed upstream of the lateral fins 18 in the air path 15 and spaced apart from each other in the vehicle width direction. The vertical fins may be supported to be tiltable in the vehicle width direction relative to the retainer body 13. All of the vertical fins in one air path 15 may be linked to each other so as to be operable via a parallel link mechanism that is not shown.

The operation knobs 19 of the air conditioning registers 11 are movable members operated by a passenger to adjust the direction of the flow of the air A1 from the outlets 16. Each operation knob 19 is mounted to one of the lateral fins 18 that is positioned at the center in the vertical direction. By sliding the operation knob 19 on the lateral fin 18 in the vehicle width direction, the vertical fin is tilted to adjust the direction of the flow of the air A1 in the vehicle width direction. By tilting the operation knob 19 in the vertical direction together with the lateral fin 18, the direction of the flow of the air A1 in the vertical direction is adjusted.

Figure 2:
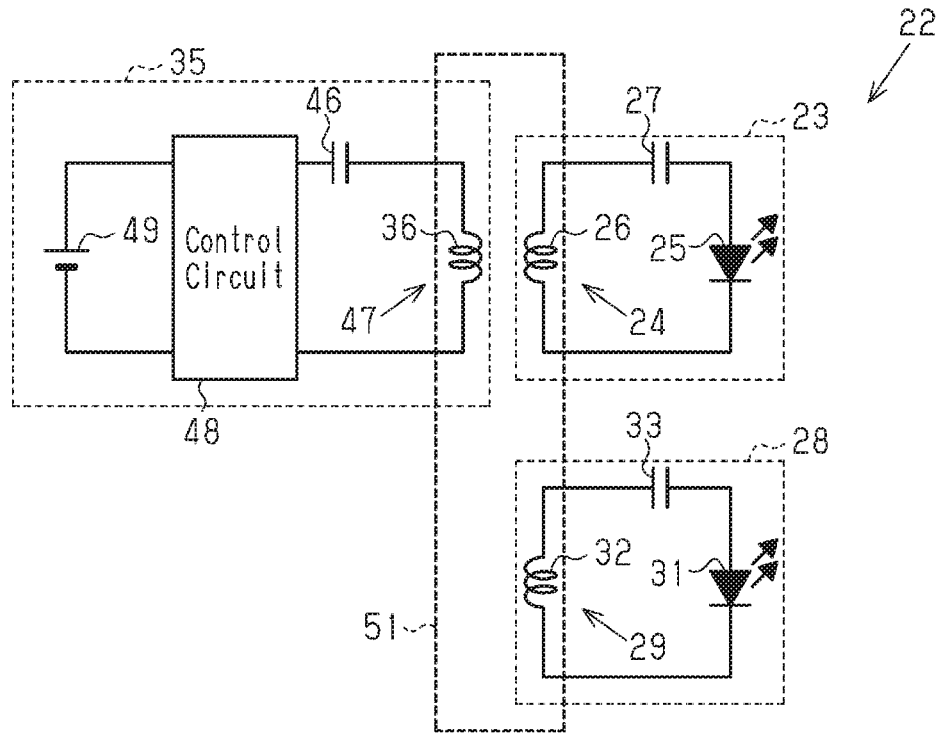
FIG. 2 is a circuit diagram of the wireless power feeder of the embodiment.

As shown in FIGS. 1 and 2, a wireless power feeder 22 includes power receiving circuits 23, 28 equal in number to the operation knobs 19 (two in the illustrated embodiment), a single power feeding circuit 35, and an electromagnetic field coupling circuit 51.

The power receiving circuit 23 has a light-emitting device 25 as a load. Examples of the light-emitting device 25 include a semiconductor device that emits light through electric energy, such as a light-emitting diode (LED) and an EL device. The power receiving circuit 23 further includes a resonant circuit 24 and is incorporated in the left operation knob 19. The resonant circuit 24 has a power receiving coil 26 and a capacitor 27 connected in series to the light-emitting device 25.

The power receiving circuit 28 has a light-emitting device 31 as a load. The power receiving circuit 28 further includes a resonant circuit 29 and is incorporated in the right operation knob 19. The resonant circuit 29 has a power receiving coil 32 and a capacitor 33 connected in series to the light-emitting device 31.

The power feeding circuit 35 includes a resonant circuit 47 having a power feeding coil 36, a capacitor 46 connected in series to the power feeding coil 36, and a control circuit 48. The power feeding circuit 35 converts DC voltage of an in-vehicle battery 49 serving as a power source to AC voltage and applies the AC voltage to the power feeding coil 36 using the control circuit 48.

Figure 3:
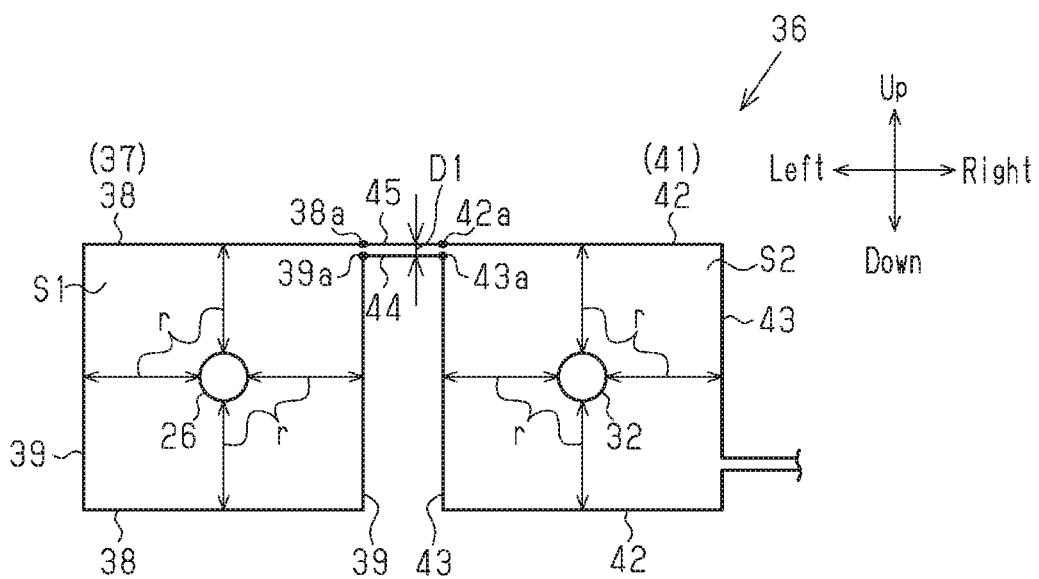
FIG. 3 is a view illustrating the positional relationship between a surrounding portion of a power feeding coil and a power receiving coil of the embodiment.

As shown in FIGS. 1 and 3, the power feeding coil 36 includes two surrounding portions 37, 41 that are equal in number to the power receiving coils 26, 32. The surrounding portions 37, 41 are spaced apart from each other in the vehicle width direction correspondingly to the retainer bodies 13. More specifically, the surrounding portions 37, 41 are disposed along the outer peripheral surface of the retainer body 13 serving as an immovable member so as to surround the retainer body 13 near the upstream end of the bezel 14. In this way, the left power receiving coil 26 is surrounded by the surrounding portion 37, and the right power receiving coil 32 is surrounded by the surrounding portion 41. The surrounding portions 37, 41 may be attached to the outer peripheral surface of the retainer body 13 with an attachment member such as an adhesive tape or the like.

The left surrounding portion 37 includes two lateral sides 38 extending in the vehicle width direction and two vertical sides 39 extending in the vertical direction. Adjacent ones of the lateral sides 38 and the vertical sides 39 are continuous with each other. The right surrounding portion 41 includes two lateral sides 42 extending in the vehicle width direction and two vertical sides 43 extending in the vertical direction. Adjacent ones of the lateral sides 42 and the vertical sides 43 are continuous with each other.

Figure 5:
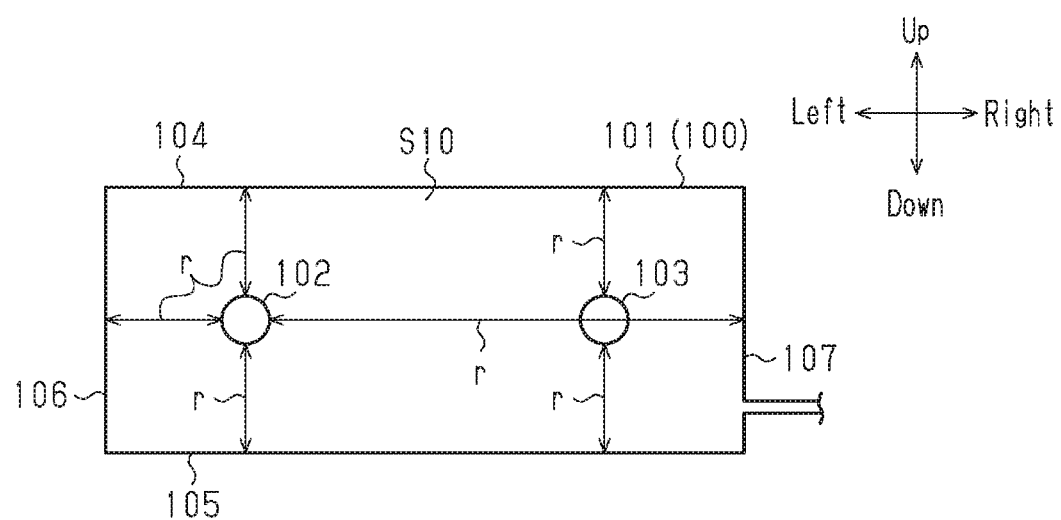
FIG. 5 is a view illustrating the positional relationship between a surrounding portion of a power feeding coil and power receiving coils of a conventional wireless power feeder.

Referring to FIG. 5 illustrating the conventional power feeding coil 100, the area of the region around the power receiving coils 102, 103 surrounded by the surrounding portion 101 is denoted by S10. Referring to FIG. 3 illustrating the power feeding coil 36 of the embodiment, the area of the region around the power receiving coil 26 surrounded by the surrounding portion 37 is denoted by S1, and the area of the region around the power receiving coil 32 surrounded by the surrounding portion 41 is denoted by S2. Given that the intervals between the lateral sides 38 of the power feeding coil 36, between the lateral sides 42 of the power feeding coil 36, and between the lateral sides 104, 105 of the power feeding coil 100 are the same and the intervals between the left vertical side 39 of the surrounding portion 37 and the right vertical side 43 of the surrounding portion 41 of the power feeding coil 36 and between the vertical sides 106, 107 of the power feeding coil 100 are the same, the areas S1 and S2 are smaller than the area S10.

The power feeding coil 36 further includes a first connecting portion 44 and a second connecting portion 45. The first connecting portion 44 and the second connecting portion 45 are positioned adjacent to each other and extend parallel to each other between the adjacent surrounding portions 37, 41 and connect the surrounding portions 37, 41. In other words, each of the surrounding portions 37, 41 has two end portions on the side closer to the adjacent surrounding portion. Specifically, the left surrounding portion 37 has an upper end portion 39a of the right vertical side 39 and a right end portion 38a of the upper lateral side 38. The right surrounding portion 41 has an upper end portion 43a of the left vertical side 43 and a left end portion 42a of the upper lateral side 42. The upper end portion 39a in the left surrounding portion 37 and the upper end portion 43a in the right surrounding portion 41 are connected to each other by the first connecting portion 44 extending in the vehicle width direction between the surrounding portions 37, 41. The right end portion 38a in the left surrounding portion 37 and the left end portion 42a in the right surrounding portion 41 are connected to each other by the second connecting portion 45 positioned adjacent to each other and extending parallel to the first connecting portion 44 between the surrounding portions 37, 41.

The first connecting portion 44 and the second connecting portion 45 are disposed at or near the upstream side of the upper end of the central part 17 of the bezel 14, e.g., on the hazard switch. FIG. 1 shows that the first connecting portion 44 and the second connecting portion 45 are spaced apart from each other in the flow direction of the air A1. However, as shown in FIG. 3, the first connecting portion 44 and the second connecting portion 15 may be spaced apart from each other in the vertical direction. The interval D1 between the first connecting portion 44 and the second connecting portion 45 may be set such that magnetic fields generated around the first connecting portion 44 and the second connecting portion 45 to influence each other and generate mutual inductance. The interval D1 is typically smaller than the interval between the lateral sides 38 and the interval between the lateral sides 42. In embodiments, the interval D1 may be 5 mm to 10 mm. The first connecting portion 44 and the second connecting portion 45 may be attached to the upper surface of the hazard switch or the like using an attachment member such as an adhesive tape.

As shown in FIG. 2, the electromagnetic field coupling circuit 51 has the power receiving coils 26, 32 and the power feeding coil 36. The electromagnetic field coupling circuit 51 constitutes an electromagnetic field resonant circuit in which magnetic field coupling via mutual inductance and electric field coupling via mutual capacitance are mixed between the power receiving coils 26, 32 and the power feeding coil 36.

In the wireless power feeder 22, the individual resonant circuits 24, 29, 47 resonate with the leakage electromagnetic field of the electromagnetic field coupling circuit 51, and power is transmitted from the power feeding coil 36 serving as the primary side of the electromagnetic field coupling circuit 51 to each of the power receiving coils 26, 32 serving as the secondary side of the electromagnetic field coupling circuit 51.

A resonance frequency f when the individual resonant circuits 24, 29, 47 resonate is calculated by the following equation (i).

$$f=1/2\pi\sqrt{(LC)} \qquad (i)$$

L: inductance of coil
C: capacitance of capacitor

In embodiments, the resonance frequency f is set to a predetermined value (e.g., 6.78 MHz). The setting is typically performed by keeping the inductance L constant and adjusting the capacitance C. However, the setting may be performed by adjusting both the inductance L and the capacitance C, which will be discussed further below.

The control circuit 48 (see FIG. 2) in the power feeding circuit 35 is configured to convert the DC voltage of the in-vehicle battery 49 to AC voltage and apply the AC voltage to the power feeding coil 36 under a predetermined situation so that the light-emitting devices 25, 31 emit light. Examples of the predetermined situation include:
  when an ignition switch is turned on;
  when a headlight or an interior light of the vehicle is turned on; and
  when an illuminance sensor disposed in the interior of the vehicle determines that it is dark in the interior.

Next, operation and effects of the wireless power feeder 22 will be described.

When the control circuit 48 determines that the predetermined situation has been met, the control circuit 48 converts the DC voltage of the in-vehicle battery 49 to AC voltage and applies the AC voltage to the power feeding coil 36. When a current flows through the power feeding coil 36, the electromagnetic field coupling circuit 51 constitutes the electromagnetic field resonant circuit between the power receiving coils 26, 32 and the power feeding coil 36. The resonant circuits 24, 29 and the resonant circuit 47 resonate with the leakage electromagnetic field of the electromagnetic field coupling circuit 51. Power is transmitted from the power feeding coil 36 of the electromagnetic field coupling circuit 51 to the power receiving coils 26, 32 so that the light-emitting devices 25, 31 emit light. Consequently, even when it is dark in the interior of the vehicle such as at night, the operation knobs 19 are visible due to light LI emitted by the light-emitting devices 25, 31 as shown in FIG. 1. Accordingly, a passenger in the vehicle can readily know the locations of the operation knobs 19 by viewing the light LI of the light-emitting devices 25, 31.

In the conventional wireless power feeder as shown in FIG. 5, the surrounding portion 101 of the power feeding coil 100 surrounds all of the power receiving coils 102, 103. Therefore, there is a significant difference in distances r between the surrounding portion 101 and the power receiving coils 102, 103. More specifically, the minimum distances r between the power receiving coils 102, 103 and each side of the surrounding portion 101 significantly vary. For example, as shown in FIG. 5, in the case where the surrounding portion 101 has a rectangular shape having two lateral sides 104, 105 and two vertical sides 106, 107, the distances r between the left power receiving coil 102 and each of the lateral sides 104, 105 and the vertical side 106 are substantially equal with each other, but the distance r between the power receiving coil 102 and the vertical side 107 is much longer.

The strength of a magnetic field generated around the surrounding portion 101 by the flow of current and acting on the power receiving coil 102 decreases with distance from the surrounding portion 101. In other words, the strength of the magnetic field decreases in inverse proportion to the distance r between the power receiving coil 102 and the surrounding portion 101. Consequently, the magnetic field generated around the vertical side 107 by the flow of current through the surrounding portion 101 and acting on the power receiving coil 102 is weaker than the magnetic field generated around each of the lateral sides 104, 105 and the vertical side 106 and acting on the power receiving coil 102. The integrated value of the magnetic fields generated around the lateral sides 104, 105 and the vertical sides 106, 107 and acting on the power receiving coil 102 is reduced due to the vertical side 107, which is distant from the power receiving coil 102. As a result, power fed to the load connected to the power receiving coil 102 is reduced.

According to the embodiment described above, as shown in FIGS. 1 and 3, the surrounding portions 37 and 41 are assigned to the power receiving coils 26 and 32, respectively, to surround them. The adjacent surrounding portions 37, 41 are connected to each other via the first connecting portion 44 and the second connecting portion 45. Accordingly, the differences in the distances r between each side of the surrounding portion 37 and the power receiving coil 26 and in the distances r between each side of the surrounding portion 41 and the power receiving coil 32 are smaller than the differences in the distances r between each side of the surrounding portion 101 and the power receiving coils 102, 103 shown in FIG. 5.

A strength H of a magnetic field at a place spaced by a distance r from a linear conductor through which a current I flows is calculated by the following equation (ii).

$$H = I/2\pi r \quad (ii)$$

Accordingly, as the distance r increases (away from the linear conductor), the strength of the magnetic field at the place reduces significantly. However, as described above, the distances r between the surrounding portion 37 and the power receiving coil 26 and the distances r between the surrounding portion 41 and the power receiving coil 32 do not increase greatly compared to the configuration shown in FIG. 5. Therefore, the integrated value of the magnetic fields generated around the surrounding portions 37, 41 and acting on the power receiving coils 26, 32 is improved. As a result, a urge amount of power can be fed to the light-emitting devices 25, 31. Thus, the wireless power feeder 22 is capable of efficiently feeding power to the light-emitting devices 25, 31.

When one of the operation knobs 19 is slid in the vehicle width direction on the lateral fin 18 or is tilted in the vertical direction together with the lateral fin 18 in order to change the direction of the flow of the air A1 from the outlet 16, the power receiving circuit 23 or 28 provided in the operation knob 19 moves together. In the case where the left operation knob 19 is moved, the distances r between the power receiving coil 26 in the power receiving circuit 23 and the surrounding portion 37 vary. In the case where the right operation knob 19 is moved, the distances r between the power receiving coil 32 in the power receiving circuit 28 and the surrounding portion 41 vary.

In the case shown in FIG. 5 in which all of the power receiving coils 102, 103 are surrounded by one surrounding portion 101, the distances r between each side of the surrounding portion 101 and the power receiving coils 102, 103 vary according to the movement of the power receiving coils 102, 103. The differences in the distances r after the power receiving coils 102, 103 are moved are greater than the differences in the distances r when the power receiving coils 102, 103 are not moved. This results in a relatively significant difference in the strength of the magnetic field generated around the surrounding portico 101 and acting on the power receiving coils 102, 103 and thus a relatively significant difference in the power fed to the power receiving coils 102, 103.

In embodiments, the differences in the distances r between each side of the surrounding portion 37 and the power receiving coil 26 after the left operation knob 19 is moved and the differences in the distances r between each side of the surrounding portion 41 and the power receiving coil 32 after the right operation knob 19 is moved are larger than the differences in the distances r when the power receiving circuits 23, 28 are not moved relative to the retainer body 13. However, these differences in the distances r after the operation knobs 19 are moved are smaller than the differences in the distances r between each side of the surrounding portion 101 and the power receiving coils 102, 103 of FIG. 5 after the power receiving coils 102, 103 are moved similarly.

Consequently, the distances r between the power receiving coil 26 and its surrounding portion 37 and the distances r between the power receiving coil 32 and its surrounding portion 41 do not increase greatly compared to the configuration shown in FIG. 5. Accordingly, variations in the strength of the magnetic field generated around each of the surrounding portions 37, 41 and acting on each of the power receiving coils 26, 32 are smaller than those in the case of FIG. 5, and variation in the power fed to the light-emitting devices 25, 31 depending on the positions of the operation knobs 19 is reduced or prevented entirely. Based on the embodiments described above, it is possible to reduce variation in the intensity (illuminance) of the light LI emitted by the light-emitting devices 25, 31 depending on the positions of the operation knobs 19. In other words, it is possible to prevent the light LI from becoming brighter or dimmer depending on the positions of the operation knobs 19.

As indicated by the above equation (i), the resonance frequency f in the resonant circuits 24, 29, 47 is inversely proportional to the root (square root) of the product of the inductance L and the capacitance C. When the resonance frequency is constant, the capacitance C is reduced as the inductance L is increased.

In the configuration shown in FIG. 5 in which one surrounding portion 101 in the power feeding coil 100 surrounds all of the power receiving coils 102, 103, the inductance L is large since the area S10 defined by the surrounding portion 101 is large. Therefore, the adjustable range of the capacitance C may be reduced to the extent that adjustment of the capacitance C is difficult.

In contrast, in the embodiment described above, the adjacent surrounding portions 37, 41 are spaced apart from each other, and are connected to each other by the first connecting portion 44 and the second connecting portion 45 extending in the direction in which the surrounding portions 37 and 41 are arranged. The first connecting portion 44 and the second connecting portion 45 are disposed adjacent to each other. The current flows through the first connecting portion 44 and the second connecting portion 45 in directions opposite to each other. Magnetic fields in opposite directions are generated in the first connecting portion 44 and the second connecting portion 45, and the electric fields influence (cancel) each other. Consequently, mutual inductance can be generated between the first connecting portion 44 and the second connecting portion 45, and the overall inductance L in the power feeding coil 36 can be made smaller than that in the case of FIG. 5. As the inductance L is reduced, the adjustable range of the capacitance C increases, and the adjustment of the capacitance C is facilitated.

The embodiment described above may provide the following additional advantages.

Usually, various existing components and devices such as a heater control panel, a steering wheel, and an air bag device are arranged around the air conditioning register 11 disposed in the central part of the instrument panel in the vehicle width direction, and there is relatively little space for a new component to be disposed. In the case where two or more power feeding circuits are used for the power receiving circuits 23, 28, it is difficult to dispose the power feeding circuits around the air conditioning registers 11. In addition, as the number of the power feeding circuits increases, the number of components of the power feeding circuits also increases, and the assembly work of the components is complicated.

In the embodiment described above, a single power feeding circuit 35 is provided for two power receiving circuits 23, 28. Accordingly, the arrangement of the power feeding circuit 35 is simple as compared to the case where one power feeding circuit is assigned per power receiving circuit. Such a configuration also reduces the number of components of the power feeding circuit 35, resulting in a simplified assembly work.

Further, when two or more power feeding circuits are used, it becomes difficult to synchronize the resonance, and mutual interference of electromagnetic fields may be caused. In the embodiment described above, only one power feeding circuit 35 is used. This facilitates synchronization of the resonances and prevention of the mutual interference of the electromagnetic fields.

The embodiment described above may be modified as follows.

The first connecting portion 44 and the second connecting portion 45 between the surrounding portions 37, 41 may be provided at different positions from those of the above embodiment.

Figure 4:
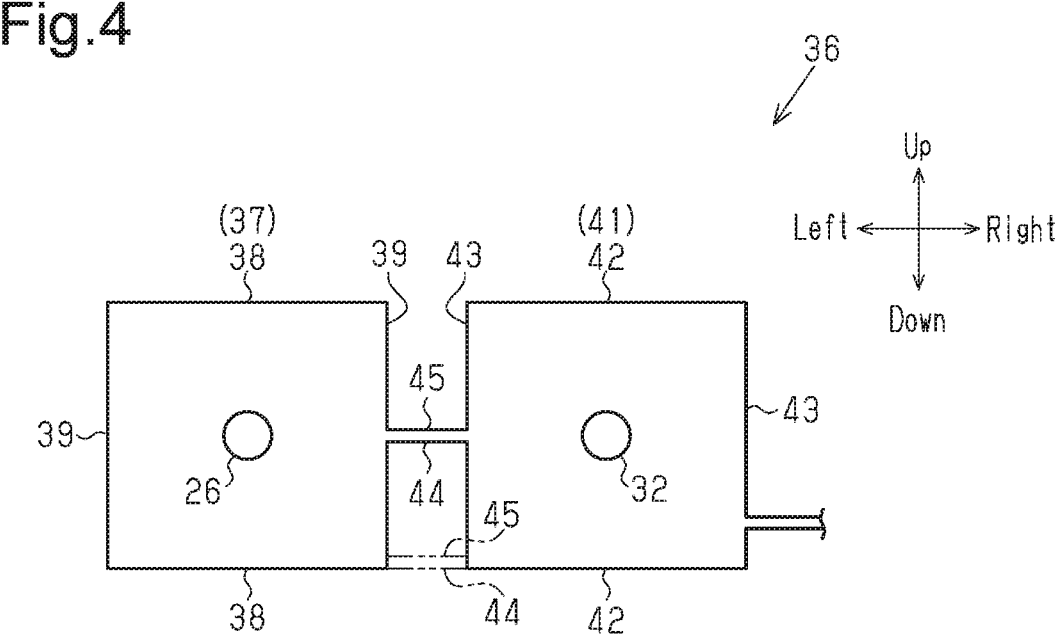
FIG. 4 is a view illustrating a modified embodiment of the power feeding coil.

FIG. 4 shows an example of the different positions of the first connecting portion 44 and the second connecting portion 45. The first connecting portion 44 and the second connecting portion 45 shown by solid lines are disposed at the middle of the vertical sides 39, 43. Alternatively, as indicated by double-dash-chain lines in FIG. 4, the first connecting portion 44 and the second connecting portion 45 may be disposed between the lower ends of the vertical sides 39, 43. In any of the modified embodiments, it is possible to increase the adjustable range of the capacitance C by adjusting the interval between the first connecting portion 44 and the second connecting portion 45 to adjust the inductance L.

Instead of using the light-emitting devices 25, 31, buzzers may be used as the load. The wireless power feeder 22 is applicable to contactlessly feeding power to the buzzers.

The wireless power feeder 22 is applicable to the case where power is contactlessly fed to light-emitting devices disposed at two or more locations in the interior of the vehicle and not in the air conditioning registers 11.

For example, in a vehicle provided with cup holders arranged side by side and each having a light-emitting device, the power receiving circuit may be provided in each cup holder, and a single power feeding circuit may be provided for these power receiving circuits.

In a vehicle provided with a vanity lamp having a light-emitting device and a drive recorder having another light-emitting device disposed near the vanity lamp, the power receiving circuit may be provided in each of the vanity lamp and the drive recorder, and a single power feeding circuit may be provided for both power receiving circuits.

In any of the cases described above, the surrounding portions equal in number to the power receiving coils are used, and the surrounding portions are disposed such that one surrounding portion surrounds one power receiving coil. Adjacent surrounding portions are connected to each other.

Using the wireless power feeder of any of the modified embodiments, it is also possible to efficiently feed power to the loads disposed at two or more locations.

The wireless power feeder is applicable not only to vehicles but also to a wide variety or equipment that contactlessly feeds power to the loads disposed at two or more locations.

When the wireless power feeder is used to contactlessly feed power to the loads disposed at three or more locations, the power feeding coil has the surrounding portions equal in number to the loads (power receiving coils). The surrounding portions are disposed such that one surrounding portion surrounds one power receiving coil. Adjacent surrounding portions are connected to each other.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Therefore, the scope of the disclosure is defined not by the detailed description, but by the claims and their equivalents, and all variations within the scope of the claims and their equivalents are to be construed as being included in the disclosure.

What is claimed is:

1. A wireless power feeder, comprising:
a power feeding circuit;
two or more power receiving circuits; and
an electromagnetic field coupling circuit,
wherein
each of the two or more power receiving circuits includes a resonant circuit having a load, a power receiving coil, and a capacitor connected in series to each other,
the power feeding circuit includes a resonant circuit having a power feeding coil and a capacitor connected in series to the power feeding coil,
the power feeding circuit is configured to convert DC voltage of a power source to AC voltage and apply the AC voltage to the power feeding coil,
the electromagnetic field coupling circuit has the power receiving coils and the power feeding coil,
the electromagnetic field coupling circuit constitutes an electromagnetic field resonant circuit in which magnetic field coupling via mutual inductance and electric field coupling via mutual capacitance are mixed between the power receiving coils and the power feeding coil, and causes each resonant circuit to resonate with a leakage electromagnetic field of the electromagnetic field coupling circuit and transmit power from the power feeding coil serving as a primary side of the electromagnetic field coupling circuit to the power receiving coil of each of the two or more power receiving circuits serving as a secondary side of the electromagnetic field coupling circuit,
the power feeding coil includes surrounding portions equal in number to the power receiving coils,
the surrounding portions are disposed such that one surrounding portion surrounds one power receiving coil,
adjacent surrounding portions are connected to each other via a first connecting portion and a second connecting portion extending straight and physically parallel to each other between the adjacent surrounding portions to connect the surrounding portions,
the first connecting portion and the second connecting portion are spaced apart from each other by a distance such that magnetic fields generated around the first connecting portion and the second connecting portion influence each other to generate mutual inductance, and
the surrounding portion is rectangular and the first or second connecting portion aligns with one of straight edges of the adjacent surrounding portions.

2. The wireless power feeder according to claim 1, further comprising an immovable member and movable members relative to the immovable member,
wherein
the two or more power receiving circuits are provided in the movable members, and
the load is a light-emitting device configured to emit light through electric energy.

3. The wireless power feeder according to claim 2, wherein the power feeding circuit is provided in the immovable member.

4. The wireless power feeder according to claim 1, wherein the distance between the first connecting portion and the second connecting portion is 5 mm to 10 mm.

5. A wireless power feeder, comprising:
a power feeding circuit;
two or more power receiving circuits; and
an electromagnetic field coupling circuit,
wherein
each of the two or more power receiving circuits includes a resonant circuit having a load, a power receiving coil, and a capacitor connected in series to each other,
the power feeding circuit includes a resonant circuit having a power feeding coil and a capacitor connected in series to the power feeding coil,
the power feeding circuit is configured to convert DC voltage of a power source to AC voltage and apply the AC voltage to the power feeding coil,
the electromagnetic field coupling circuit has the power receiving coils and the power feeding coil,
the electromagnetic field coupling circuit constitutes an electromagnetic field resonant circuit in which magnetic field coupling via mutual inductance and electric field coupling via mutual capacitance are mixed between the power receiving coils and the power feeding coil, and causes each resonant circuit to resonate with a leakage electromagnetic field of the electromagnetic field coupling circuit and transmit power from the power feeding coil serving as a primary side of the electromagnetic field coupling circuit to the power receiving coil of each of the two or more power receiving circuits serving as a secondary side of the electromagnetic field coupling circuit,
the power feeding coil includes surrounding portions equal in number to the power receiving coils,
the surrounding portions are disposed such that one surrounding portion surrounds one power receiving coil,
adjacent surrounding portions are connected to each other via a first connecting portion and a second connecting portion extending straight and physically parallel to each other between the adjacent surrounding portions to connect the surrounding portions,
the first connecting portion and the second connecting portion are spaced apart from each other by a first distance such that magnetic fields generated around the first connecting portion and the second connecting portion influence each other to generate mutual inductance,
the first distance between the first connecting portion and the second connecting portion is 5 mm to 10 mm,
each of the adjacent surrounding portion is spaced apart from a corresponding one of the power receiving coils by at least a second distance, and
the first distance is smaller than the second distance.

6. The wireless power feeder according to claim 5, further comprising an immovable member and movable members relative to the immovable member,
wherein
the two or more power receiving circuits are provided in the movable members, and
the load is a light-emitting device configured to emit light through electric energy.

7. The wireless power feeder according to claim 6, wherein the power feeding circuit is provided in the immovable member.

8. The wireless power feeder according to claim 5, wherein the surrounding portion is rectangular and the first or second connecting portion aligns with one of straight edges of the adjacent surrounding portions.

9. A wireless power feeder, comprising:
a power feeding circuit;
two or more power receiving circuits; and
an electromagnetic field coupling circuit,
wherein
each of the two or more power receiving circuits includes a resonant circuit having a load, a power receiving coil, and a capacitor connected in series to each other,
the power feeding circuit includes a resonant circuit having a power feeding coil and a capacitor connected in series to the power feeding coil,
the power feeding circuit is configured to convert DC voltage of a power source to AC voltage and apply the AC voltage to the power feeding coil,
the electromagnetic field coupling circuit has the power receiving coils and the power feeding coil,
the electromagnetic field coupling circuit constitutes an electromagnetic field resonant circuit in which magnetic field coupling via mutual inductance and electric field coupling via mutual capacitance are mixed between the power receiving coils and the power feeding coil, and causes each resonant circuit to resonate with a leakage electromagnetic field of the electromagnetic field coupling circuit and transmit power from the power feeding coil serving as a primary side of the electromagnetic field coupling circuit to the power receiving coil of each of the two or more power receiving circuits serving as a secondary side of the electromagnetic field coupling circuit,
the power feeding coil includes surrounding portions equal in number to the power receiving coils,
the surrounding portions are disposed such that one surrounding portion surrounds one power receiving coil,
adjacent surrounding portions are connected to each other via a first connecting portion and a second connecting portion extending straight and physically parallel to each other between the adjacent surrounding portions to connect the surrounding portions,
the first connecting portion and the second connecting portion are spaced apart from each other by a first distance such that magnetic fields generated around the first connecting portion and the second connecting portion influence each other to generate mutual inductance,
the first distance between the first connecting portion and the second connecting portion is 5 mm to 10 mm,
the adjacent surrounding portions are spaced apart from each other by a second distance, and
the first distance is smaller than the second distance.

10. The wireless power feeder according to claim 9, further comprising an immovable member and movable members relative to the immovable member,
wherein
the two or more power receiving circuits are provided in the movable members, and
the load is a light-emitting device configured to emit light through electric energy.

11. The wireless power feeder according to claim 10, wherein the power feeding circuit is provided in the immovable member.

12. The wireless power feeder according to claim 9, wherein the surrounding portion is rectangular and the first or second connecting portion aligns with one of straight edges of the adjacent surrounding portions.

\* \* \* \* \*